Sept. 22, 1931.    A. F. EVERHART    1,823,973
SELF ADJUSTING BRAKE MECHANISM
Filed Oct. 25, 1929
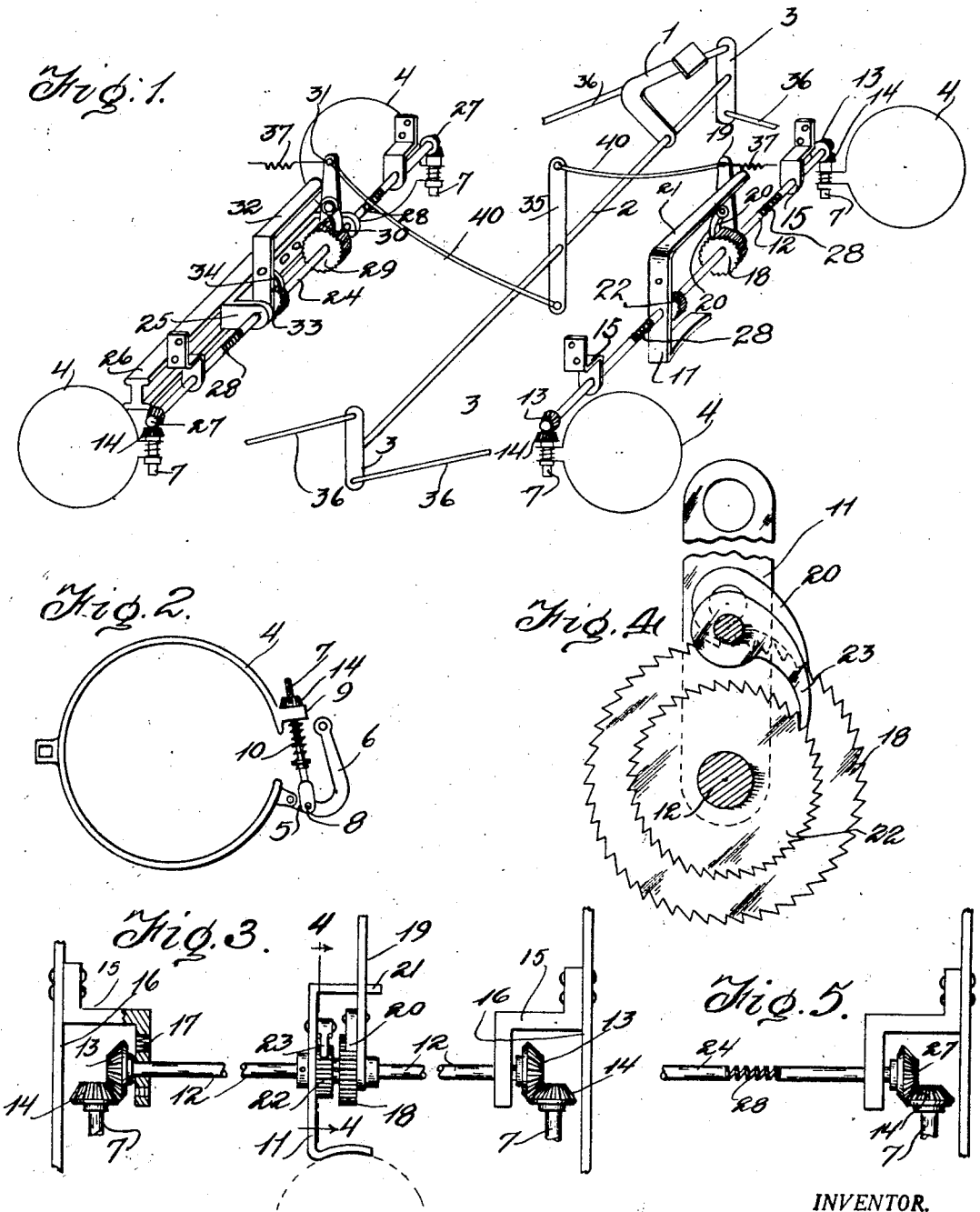
INVENTOR.
Audley F. Everhart,
BY
Donald L. Maxson.
ATTORNEY Patented Sept. 22, 1931

1,823,973

UNITED STATES PATENT OFFICE

AUDLEY F. EVERHART, OF DUNLO, PENNSYLVANIA, ASSIGNOR OF ONE-HALF TO JOSEPH MARAVALLI

SELF ADJUSTING BRAKE MECHANISM

Application filed October 25, 1929. Serial No. 402,454.

This invention relates to improvements in self adjusting brake mechanisms, and more particularly to a mechanism which may be employed on either a two-wheel brake or four-wheel brake equipment on an automobile to automatically retain the brakes in their proper adjustment.

An object of the invention is to provide an improved self adjusting brake mechanism for automobiles which will remain inoperative while the brake pedal is moved forward approximately two thirds of the distance towards the floor of the automobile, but when the said brake pedal is pushed clear to the floor will automatically bring the several parts into operation, thereby retaining the brakes at all times in their proper adjustment.

A further object of the invention is to provide an improved self adjusting automatic brake mechanism, which will be highly efficient in operation to retain the brakes in their proper adjustment at all times, and which will be inexpensive to manufacture.

A still further object of the invention is to provide an improved self adjusting brake mechanism for automobiles which will be so formed and arranged that it may be made as an accessory for an automobile, or be built into the car assembly when the same is manufactured in the factory.

Other objects will appear as the description proceeds.

In the accompanying drawings which form a part of my application,

Fig. 1 is a diagrammatic view of my improved self adjusting brake mechanism;

Fig. 2 is a side elevation of a brake band with my invention applied thereto;

Fig. 3 is a rear elevation, partly in section of the rear brake mechanism with my invention applied thereto;

Fig. 4 is a sectional view taken on the line 4—4 of Fig. 3, and

Fig. 5 is a detail view of the front wheel brake adjusting mechanism with universal connection.

Like characters of reference are used throughout the following specification and the accompanying drawings to designate corresponding parts.

In carrying out my invention, I employ the usual brake operating foot pedal 1 mounted on the transverse rod 2 which carries the toggle levers 3 at each end thereof.

Each wheel of the automobile will be provided with a brake band 4 having a toggle connection 5 and operating lever 6 to clamp the said band against the brake lining when desired. A screw 7 will be supported by the pivot pin 8 at the inner end of each lever 6, and will extend up through the perforate ear 9 on the opposite end of the band 4, and will support a bevel gear on its outer end for purposes of adjustment. A coil spring 10 will be positioned about each screw 7 between the adjacent ends of the band 4, to normally hold the said ends separated to prevent burning of the brake lining.

The rear assembly will include a supporting bracket 11, which may be secured to the differential housing, or to any desired part of the automobile, and will support a transverse shaft 12 carrying bevel gears 13 at its opposite ends which will mesh with the bevel gears 14 on the ends of the screws 7. Bracket arms 15 will be mounted in any suitable manner upon the brake housings 16, and will be formed with a slidable bearing, tensioned by the springs 17, in order that the gears 13 and 14 will at all times be held in mesh with each other.

An operating gear 18 will be secured to the shaft 12 and may be rotated by the operating arm 19, which in turn carries a pawl 20, the said arm being loosely mounted on the shaft. A stop arm 21 will be supported on the bracket 11 to limit the movement of the arm 19. A second gear, or locking gear 22 will also be secured to the shaft 12, and will have a pawl 23 cooperating therewith to lock the several parts in their adjusted position.

I have illustrated the front assembly as provided with a single shaft 24 supported in the brackets 25 upon the front axle 26, but it will be obvious that there might be two short shafts with independent mountings should the motor of the automobile prevent the use of a single shaft due to the amount of space it occupies. The shaft 24 will carry bevel gears 27 at each end to mesh with the gears 14 on the screws 7, and will also have the universal connections or joints 28 to permit the play in the front part of the automobile. The shaft 24 will also be provided with an operating gear 29 secured thereto, and which will be rotated by the pawl 30 on the operating arm 31 freely rotatable on the said shaft 24. A stop bar 32 will limit the movement of the arm 31, and may be mounted in any desired manner or place. A locking gear 33 secured to the shaft 24 will cooperate with the pawl 34 to hold the several parts of the assembly in adjusted position.

The control lever 35 mounted on the transverse rod 2 will be connected with the operating arms 19 and 31 and will utilize a slack cable 40 for this purpose, and which will not be drawn taut until the brake pedal 1 is forced approximately two-thirds of the way towards the floor of the automobile, whereupon further depressing of the pedal will move the arms 19 and 31 to cause the automatic adjustment of the brakes through the cooperative rotation of the gears 18 and 22, and 29 and 33. Brake operating rods 36 will connect the opposite ends of the levers 3 with the outer ends of the operating levers 6, whereby any movement of the brake pedal 1 will brake the automobile. Springs 37 may be secured to the operating arms 19 and 31 to retract the same into their normal position when the brake pedal is not being operated.

It will be apparent that I do not intend to limit myself to the exact construction illustrated and described, as many minor changes in detail of construction may be resorted to without departure from the spirit of the invention.

Having thus described my invention what I claim as new and desire to secure by Letters Patent of the United States is:

1. In a self adjusting brake mechanism, the combination of a plurality of brake bands, band contracting means carried by the bands, transverse connections between said front and back bands, play compensating universals in said transverse connections, means for simultaneously adjusting said brake bands, means for limiting the movement of the adjusting means for said bands, and means for retaining the brakes in adjusted position after the same have been adjusted.

2. The subject matter as claimed in claim 1, and resilient means for holding said brake adjuster means in contact with the adjusting means for adjusting the brakes.

3. The subject matter as claimed in claim 1, and a resiliently tensioned slidable bearing for holding said brake adjuster means in contact with the adjusting means for adjusting said brakes after the same have been compressed.

In testimony whereof I affix my signature.

AUDLEY F. EVERHART.